March 1, 1966  R. LUCIEN  3,237,996
ANTI SKID BRAKE CONTROL
Filed May 31, 1962

March 1, 1966  R. LUCIEN  3,237,996
ANTI SKID BRAKE CONTROL
Filed May 31, 1962  5 Sheets-Sheet 2

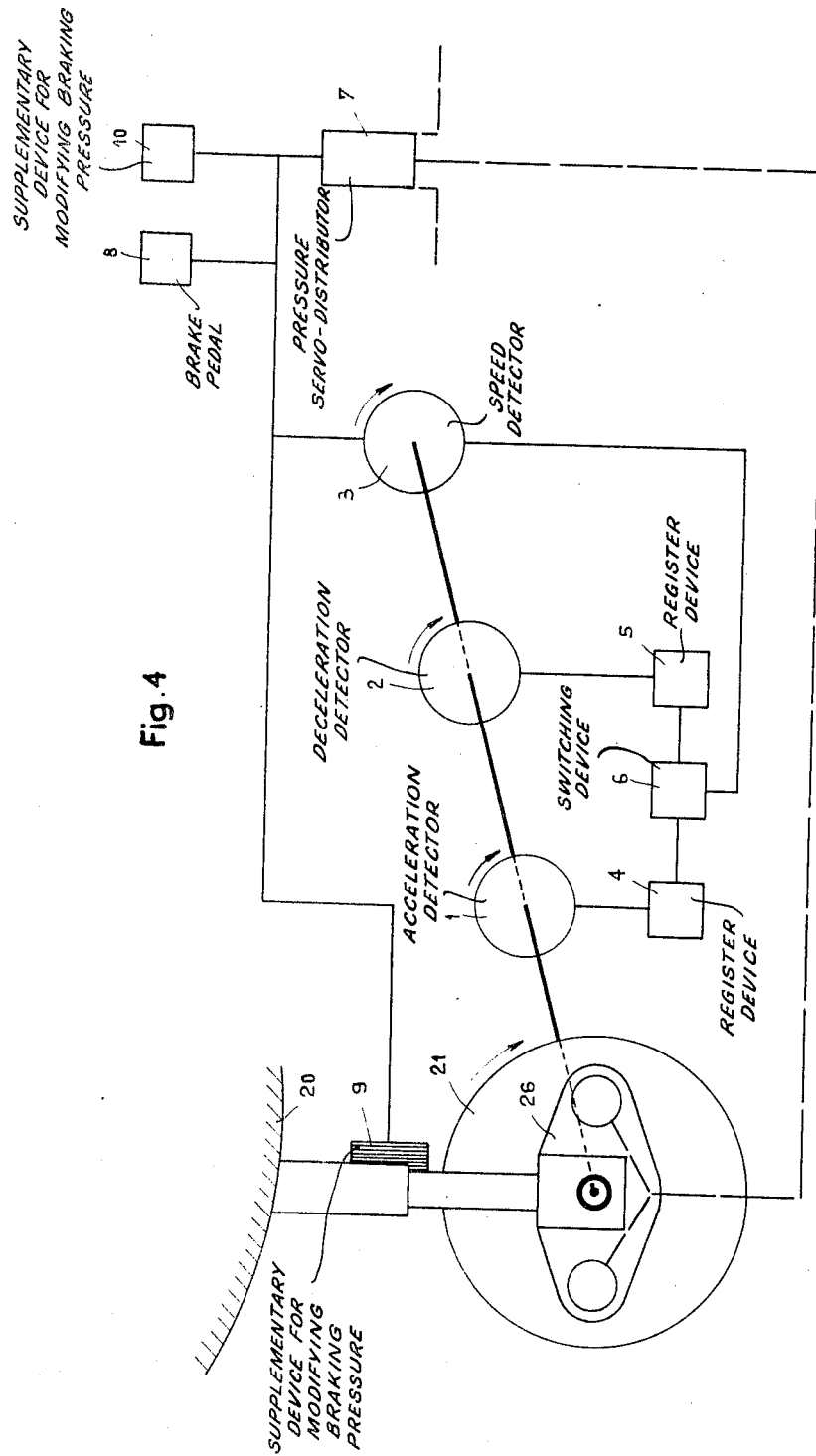

March 1, 1966  R. LUCIEN  3,237,996
ANTI SKID BRAKE CONTROL
Filed May 31, 1962

United States Patent Office 3,237,996
Patented Mar. 1, 1966

3,237,996
ANTI SKID BRAKE CONTROL
René Lucien, 56 Blvd. Maillot, Neuilly-sur-Seine, France
Filed May 31, 1962, Ser. No. 200,021
Claims priority, application France, June 5, 1961,
863,954
12 Claims. (Cl. 303—21)

This invention relates to a method and a device for controlling the braking of a wheeled vehicle.

It is known to provide wheeled vehicles with devices for avoiding the locking of the wheels. In these devices, a signal indicating the ceasing of the application of the brake is transmitted to a brake-installation whenever the angular deceleration exceeds a predetermined value. The problem of choosing this value is very difficult: if this value is chosen too small, the braking distance may be increased to an locking degree; while if said value is chosen too high, locking might occur whenever the rolling conditions of the wheel are other than expected. Indeed, as soon as sufficient braking capacity of the vehicle is desired to be maintained, the control device commences to function only when skidding of the tire has already started. The time of response of the control device must also be taken in consideration.

In view of these difficulties, the known devices are often actuated only when particular circumstances increasing the risk of locking of the wheels are expected, so that locking may take place, if the actual conditions do not correspond to those anticipated.

One object of the invention is to provide a method and a device whereby a wheeled vehicle is braked under the best possible conditions of efficiency and safety.

Another object of the invention contemplates means by which skidding of the tire on the ground is absolutely avoided in spite of variations in the condition of the surface of the ground. It is also an object of the invention to provide a device adapted to control the breaking action of a wheeled vehicle, said device being of simple construction and adapted for use in existing braking-installations.

A further object of the invention is to provide an installation which can be adjusted easily in accordance with the condition of the ground and with the variable conditions prevailing during the braking of vehicles, such as upon the landing of airplanes.

According to the invention, the braking of a wheeled vehicle is established by measuring the acceleration or speeding up of the wheels of the vehicle after a braking action which is a function of—among other factors—the tire-ground coefficient of friction; thus of the state of the ground, and the result of this measurement is used to operate the braking-installation such that the braking pressure cannot attain a value beyond which the wheel might be locked. The measurement of the acceleration of the wheels may be conducted at intervals to continually reevaluate the coefficient of friction between the tire and the ground.

The invention thus permits the installation at every moment to be in the most favorable condition for breaking and to ensure the desired braking at the required intensity, with the certainty that at no moment will locking of the wheel occur. If therefore permits to make the best possible use of an existing braking installation, and to take account in the best possible way of the condition of the ground on which the vehicle moves.

In case a rapid braking action is required this invention makes it possible to ensure the stopping of the vehicle at a minimum distance and without any risk of an accident.

According to one embodiment according to the invention, the braking pressure is modulated in relation to an average value, which—further—might be adjustable, the maximum value of this pressure without any locking being determined from the acceleration or the decrease of deceleration of a wheel during a decrease of the braking pressure.

The modulation of the braking pressure is chosen in accordance with the result desired. This modulation can be sinusoidal or can have a similar form.

In that respect, the slopes of the ascending branches of the sinusoid are to vary from those of the descending branches.

The modulation (curve) can also be of a rectangular form.

The invention considers to vary automatically the depth of the modulation so as to adapt the system to different conditions of variations of the coefficient of friction between the ground and a tire on the wheel, a relatively deep modulation being preferred whenever it is expected that the particular ground has widely varying coefficients of friction.

The modulation-depth may be kept much smaller in cases where the ground has uniform surface conditions.

The invention contemplates a preferred embodiment according to which the decrease of the amplitude of the modulation is obtained by means of a deceleration-detector. The best possible efficiency can thus be obtained in the case of a certain ground.

The acceleration or the decrease of deceleration introduced by the decrease of the braking pressure corresponding to a descending branch of the representative curve of the braking intensity is determined by any known means, for instance by an inertia-mass disposed co-axially with the wheel, mounted freely, and fitted onto the wheel with elastic means, the acceleration being expressed in this case by an angular variation between the inertia-mass and the wheel.

The acceleration is advantageously sensed by potentiometric means in the form of an electric voltage, and said voltage is applied to a servo-distributing device of the braking fluid to limit the maximum pressure of admission of the braking fluid to those members which are provided for the braking of the wheel.

The invention also considers to make the servo-distributing device, onto which the potentiometric voltage expressing the acceleration is applied, likewise responsive to the rotational speed of the wheel, as also to the pressure exerted by the wheel on the ground, which latter factor varies considerably in the case of airplane landing, whereby, evidently, said servo-device remains also responsive to the control-action of the conductor or the pilot, so that the braking intensity can be adjusted at his will.

With these and other objects in view, the invention consists in the construction, arrangement and combination of the various parts of the device whereby the objects contamplated as attained, as hereinafter set forth, are pointed out in the appended claims and illustrated in the accompanying drawings.

In the accompanying drawings:

FIG. 4 is a schematic view of a braking installation according to the invention, showing one embodiment.

Figure 1:
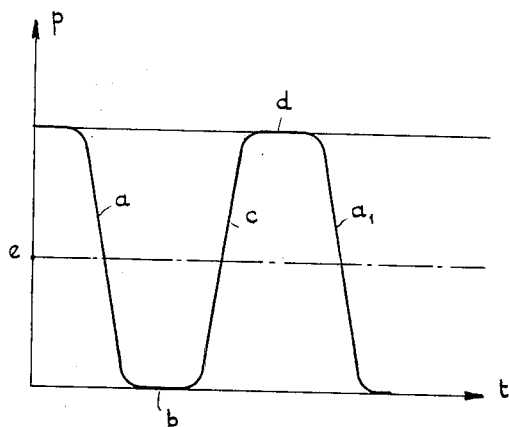
FIG. 1 is a diagram showing the braking pressure as a function of time, this diagram being shown for explanatory reasons.

FIG. 1 shows by way of example and mainly in explanatory fashion a diagram showing as a function of time the pressure of the braking fluid of a braking installation of a wheeled vehicle provided with a control device according to the invention. The diagram comprises, starting from a certain origin, a descending portion $a$ followed by a lower level portion $b$ which is followed by a rising portion $c$ followed by an upper level portion $d$, then again by a descending portion $a$, etc. According to the invention, one detects or measures the acceleration of the wheel, which occurs when the pressure of the braking fluid decreases or is at its lowest level and the value of the braking pressure of the immediately following period corresponding, in the example cited, to the portions $c$ and $d$ of the diagram are suitably controlled. This braking pressure depends thus on the acceleration, which the wheel has attained during the period of release of the brakes corresponding to the portion $b$, and which can be attributed to the actual conditions between the tire with the running surface of the ground during said period.

Figure 2:
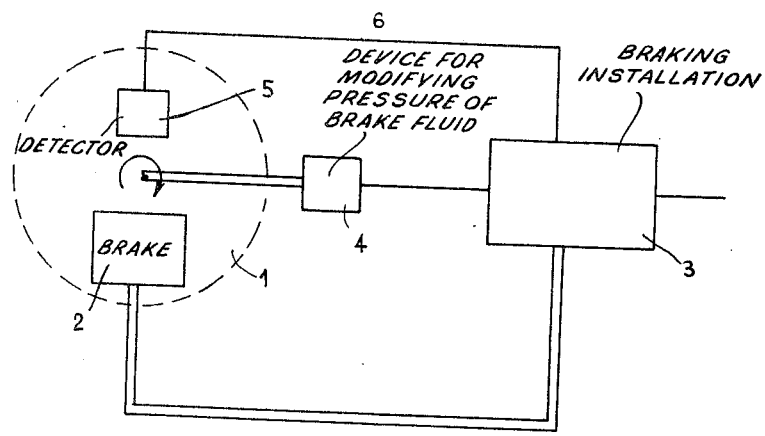
FIG. 2 is a schematical representation of an installation improved in accordance with this invention.

FIG. 2 shows schematically a hydraulic braking installation provided with a control device according to the invention. The wheel 1 is provided with a brake 2 actuated hydraulically by being connected to the braking installation 3. The wheel 1 drives mechanically a device 4, which periodically annuls or decreases the pressure of the braking fluid. During the period of release of the brakes, a detector 5 measures the angular acceleration of the wheel 1 which through a line 6, having a time-constant, is fed into the braking installation so as to control the pressure of the braking fluid applied to the brake 2 during the following period, that is, when the device 4 is inoperative.

In cases where the braking installation has a variation of pressure of the braking fluid as shown in the diagram of the FIG. 1, the braking distance is a function of a braking pressure of a value $e$, between $b$ and $d$.

Figure 3:
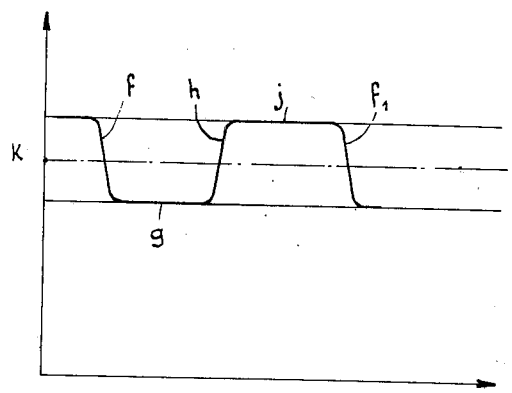
FIG. 3 is a similar diagram to the one shown in FIG. 1, but for a preferred embodiment.
Figure 5:
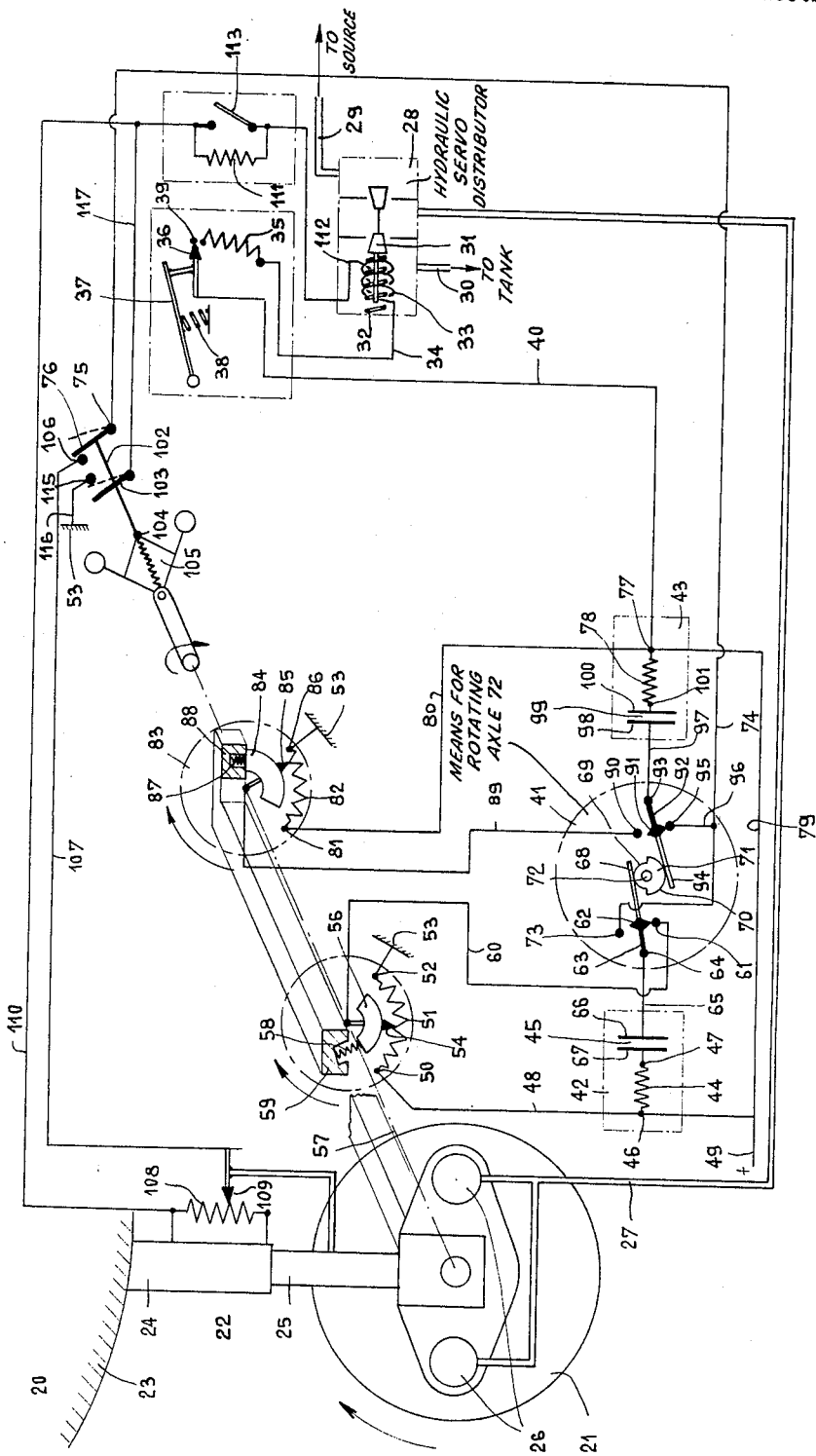
FIG. 5 is a similar view to the one shown in FIG. 4, but showing the electrical circuits.

The invention concerns likewise a preferred embodiment according to which the representative diagram of the braking pressure is of the kind shown in FIG. 3, wherein starting with a descending portion $f$, a lower level portion $g$ having an ordinate of a value different from zero, an ascending portion $h$, an upper lever portion $j$, then another descending portion $f_1$, etc., the braking distance being thus a function of the application of a braking pressure of a constant value $k$ intermediary between the ordinates of the level portions $j$ and $g$. FIGS. 4 and 5 show by way of example in a schematic manner an improved installation for providing a braking action according to this diagram.

The vehicle 20 (FIG. 4) comprises a wheel 21 provided with a tire and equipped with a hydraulic brake 26. A detection device is adapted to detect the acceleration of the wheel 21, its deceleration and the speed of said wheel. In order to simplify the representation this device has been shown in three parts, namely an acceleration detector 1, a deceleration detector 2 and a speed detector 3. The indications of the acceleration detector 1 are transmitted to a registering device 4 and the indications of the deceleration detector 2 to a registering device 5. A switching device 6 is adapted to transmit successively the indications, furnished to the two registering devices 4 and 5, to a hydraulic pressure servo-distributor 7. The speed detecting device 3 is adapted to disconnect the braking control device at a very low speed. The electro-hydraulic servo-distributor 7 furnishes hydraulic pressure to the brake 26. A manual brake command or a foot pedal 8 connected to the electrical circuit of the servo-distributor of the brake permits the pilot of the vehicle to apply the braking action at his will. The installation also comprises a supplementary device 9 which can modify the braking pressure as a function of the load supported by the wheel to be braked, and a second supplementary device 10 which can modify the braking pressure in function of the driving power of the vehicle.

FIG. 5 shows by way of example such an embodiment in a more detailed manner. The vehicle 20, which is assumed to be an aircraft, includes wheels 21 which are supported on the ground. An elastic suspension system 22 is interposed between the body 23 of the vehicle and the wheel 21, said system comprising a member 24 integral with the body 23, and a member 25 slidably mounted in relation to the member 24 and integral with the wheel 21. The wheel is provided with braking means 26, the braking intensity of which depends on the pressure prevailing in a hydraulic duct 27 supplied from a hydraulic servo-distributor 28 which is connected to a pressure source by means of a duct 29, and to a tank by means of a duct 30. The pressure prevailing in the duct 27 depends on the position of the valve 31 acted upon by a spring 32 and carried by magnetic core so as to be sensitive to the intensity of a current flowing in a winding 33, this whole disposition being known per se and being such, that the pressure supplied at duct 27 is proportional to the intensity of the electric current flowing in the winding 33. The winding 33 is a part of an electric circuit 34 which comprises a potentiometer resistance 35 whose movable member 36, or movable contact, is moved by means of a foot pedal 37 or the like which can be actuated by the pilot against the action of a return spring 38, the movable contact 36 being placed on a dead contact stud 39 when no pressure is applied on the pedal 37. The movable contact 36 is part of a circuit 40 which —by rotating means 41—is alternately connected to the one or to the other of two electrical sources 42 and 43, respectively, the values of the voltage of which, when operative, depend on the acceleration of the wheel or on its deceleration during the immediately preceding period of time. The source 42 comprises, in the example cited, a resistance 44 and a condenser 45 mounted in series: the extremity 46 of the resistance 44 opposed to the extremity 47 connected to condenser 45 is connected to a conductor 48 interposed between the positive terminal 49 of an electrical supply source and the extremity 50 of a potentiometer resistance 51 whose extremity 52 is connected to the negative terminal 53 of said supply source. The movable contact 54 of the potentiometer is carried by a mass 56, mounted so as to rotate freely around the axis 57 of the wheel 21, this mass being biased by a spring 58 which is held by a stop 59 integral with said wheel, the mass 56, the spring 58 and the stop 59 following one another in the same direction as that intended to be the direction of rotation of the wheel, the assembly thus constituting a detector or a potentiometric sensing means of the accelerations. Said movable contact is a part of a circuit 60 leading to a contact stud 61 with which a contact 62 can cooperate, said contact being carried by an insulating finger 63 revolubly mounted on the pin 64 and connected to the conductor 65 of plate 66 of a condenser 45, opposed to its plate 67 which is connected to the resistance 44. The finger 63 is conductive between pin 64 and contact 62 and is prolongated by a non-conductive member 68 which cooperates with one of the circular tracks 69 and 70, each of different radius, of a cam 71 revolubly mounted on an axle 72 and rotated by any appropriate means and advantageously by means of the wheel 21. In the position shown in the figure, the member 68 cooperates with the track 69 having a small radius, so that the contact 62 cooperates with the stud 61; when the member 68 cooperates with the track 70 of great radius, the contact 62 cooperates with a stud 73 being the extremity of a circuit 74, whose other extremity is connected to the axis 75 about which a conducting arm 76 can oscillate. The extremity 77 of the resistance 78 is a part of the source 43 and is connected to circuit 40 as well as to the positive terminal 49 of the supply source by means of the conductor 79 and is further connected by means of conductor 80 to the extremity 81 of a potentiometer resistance 82 of a deceleration sensing device or detector 83, which is of the same type as the detector of the acceleration or of the decrease of deceleration described before. Said deceleration detector comprises a mass 84 mounted to rotate freely around the axle 57 of the wheel, on which latter is fixed a movable contact 85 which cooperates with the resistance 82, whose extremity 86 is connected to the negative terminal 53 of the supply source. The mass 84 is biased by a spring 87 supported by a stop 88 integral with the wheel, said mass 84, the spring 87 and the stop 88 following one another in the inverse of the direction of rotation of the wheel as shown by the arrow. The movable contact 85 is connected by a circuit 89 to a stud 90 with which a contact 91 can cooperate, said contact being disposed on the conducting oscillating lever 92 revolubly mounted on an axis 93 and prolongated by an isolating member 94, which latter cooperates with one or the other of the tracks 69 and 70 of the cam 71, the contacts points of members 68 and 94 with said cam being approximately diammetrally opposed one to the other, so that, when one cooperates with the track of small radius, the other will cooperate with the track of great radius. In the position shown in the figure, the member 94 cooperates with the track 70 and the contact 91 is on the stud 95, which is connected to the circuit 74 by means of conductor 96. The axis 93 is connected by means of a conductor 97 to the plate 98 of the condenser 99, whose other plate 100 is connected to the extremity 101 of the resistance 78 opposed to the extremity 77.

The arm 76 is carried by a lever 102, on which another arm 103 is mounted, said lever 102 being attached in 104 to the mobile element of a centrifugal governor 105 driven by the movement of the wheel. Beyond a certain rotational speed of the wheel, the arm 76 will thus cooperate with the contact 106 being the extremity of a circuit 107, which comprises a potentiometer resistance 108, whose mobile member, or movable contact, 109, follows the movement of the mobile element 25 of the system of suspension, whereby the resistance 108 is connected to a circuit 110 which latter is connected by means of a constant or adjustable resistance 111 to the extremity 112 of the coil 33 at a point opposed to the extremity connected to circuit 34. An arm 113 permits to short-circuit at will the resistance 111.

In the embodiment shown in the drawing, the acceleration-detector of the wheel, the deceleration-detector and the means making the device operative only at a certain speed have been shown as separate devices, but they can in other embodiments be assembled in two distinct devices or even constitute only one device.

Figure 6:
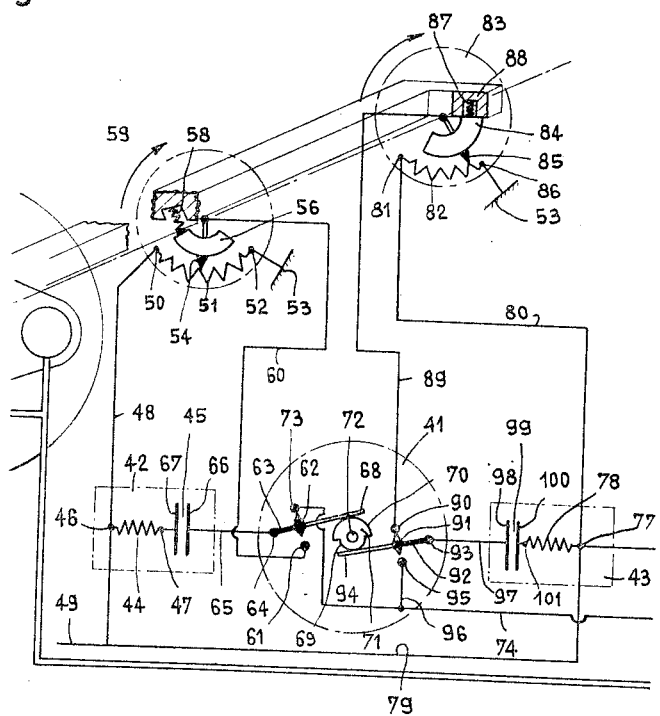
FIG. 6 is a view similar to the one shown in FIG. 5, illustrating a portion of the circuit in another condition of operation.

The operation is as follows:

When the pilot presses on the foot pedal 37, circuits 40 and 34 are connected, which until then had been separated due to the movable contact 36 having been placed on the dead contact stud 39. In the position shown in the FIGURE 5, there flows a current in the coil winding 33 which depends on the condition of the electric charge of condenser 99, and this in a circuit which comprises, starting from the plate 100 of said condenser, the resistance 35, the coil winding 33, the resistance 111, the conductor 110, the part of the potentiometer resistance 108 operative by means of the action of the mobile contact 109, the conductor 107, the arm 76, the conductor 74, the conductor 96, the stud 95, the contact 91 and the oscillating finger 92, the conductor 97 up to the other plate 98 of condenser 99. The condition of the charge of the source 43 depends on the conditions prevailing during the preceding time period during which the members connected to the commutator 41 are in the position as shown in FIG. 6. During this time, the plate 100 of condenser 99 is still connected to the positive terminal 49 of the supply source by means of the resistance 78 and conductor 79. The plate 98 is connected by means of conductor 97, of the oscillating finger 92, of the contact stud 90, of the conductor 89 and of the conductive inertia mass 84 to the mobile contact 85 whose potential difference it measures—which potential difference depends on the position of said mobile contact on the potentiometer resistance 82 and, consequently, of the deceleration of the wheel 21 during said time period. The current flowing in the coil winding 33 in the condition shown in FIG. 5 will thus have a greater or lesser value as said deceleration or decrease of the acceleration during the precedent time period (FIG. 6) will have a more or less high value, and that will also apply for the braking pressure in duct 27 which is proportional to the current flowing in the coil winding 33 and, consequently, to the braking intensity.

During the period considered and in the condition shown in the FIG. 5, the condenser 45 is being charged. Its plate 67 is connected to the positive terminal 49 of the supply source through the resistance 44. Its other plate 66 is connected through conductor 65, the conducting finger 63, the contact stud 61, the conductor 60 and the conductive mass 56 to the mobile contact 54 whose potential difference it takes, said potential difference depending on the position of said mobile contact on the potentiometric resistance 51 and therefore of the value of the acceleration at the instant considered.

During the following period, the rotating commutator is in the position shown in FIG. 6, and the condenser 45 will effect the electric supply of the coil winding 33 by means of a circuit which comprises, starting from the plate 66 of said condenser: the conductor 65, the contact 64, the oscillating finger 63, the contact 62, the contact stud 73, the conductor 74, the arm 76, the conductor 107, the mobile contact 109, the potentiometric resistance 108, the conductor 110, the resistance 111, the coil winding 33, the conductor 34, the potentiometric resistance 35, the conductor 40, the conductor 79, the resistance 44 up to the other plate 67 of the condenser 45. The coil winding 33 is thus passed through by a current having an intensity which depends on the value of the acceleration of the wheel during the preceding time period, and the braking pressure being proportional to said current has therefore a value which depends on this previous acceleration.

If, for any reason, the coefficient of friction of the tire with which the wheel is provided tends to decrease during the movement on the ground, the acceleration produced during the period corresponding to the portion g, for instance, of the diagram of FIG. 3, is smaller than before as so that at the following commutation the intensity of the electric current flowing in the coil winding 33 will be weaker and the braking pressure will be lower, the braking pressure thus tending to take an optimum value for the ground encountered.

The intervention of the potentiometer devices 108, 109 automatically takes into consideration the speed of the airplane during landing, the contraction of the landing gear or the suspension system 22 being absolutely related to said speed for the type of airplane considered, and providing thus a pre-regulation of the braking action by correction of the average value of the pressure.

The short-circulating of the resistance 111 by means of the arm 113 permits the pilot to obtain the braking intensity necessary for remaining stopped during the testing of the engines in accordance with regulations.

When the airplane is immobile on the ground or advances at a low speed, the arm 76 is out of contact with the stud 106, since the centrifugal governor does not revolve or revolves only very slowly; on the contrary, the arm 103 is brought into the position (as shown in dotted line) where it cooperates with the contact stud 115, which is connected by means of conductor 116 to the negative terminal 53 of the supply source. The coil winding 33 is thus supplied directly by a circuit which comprises, starting from the negative terminal 53: the stud 115, the arm 103, the conductor 117, the resistance 111 (or the arm 113), the coil 33, the potentiometric resistance 35, the circuit 40, the conductor 74 up to the positive terminal 49 of the source.

The preceding description is in no way restrictive but has simply for object to explain in a detailed manner the operation of an installation according to this invention for an embodiment chosen between a great number of possible embodiments.

Figure 7:
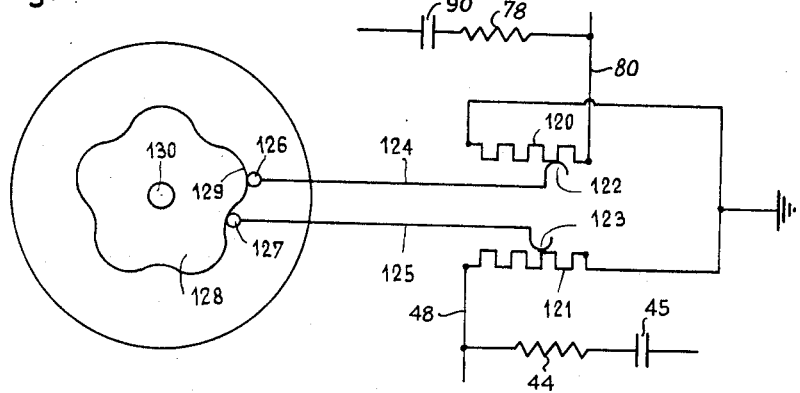
FIG. 7 is a schematic view of a device according to another embodiment.

Reference is now made to FIG. 7 concerning a modification of the commutation of the operation of the acceleration detector or the deceleration detector. In this modification, the potentiometer resistances 120 and 121 respectively, are interposed between the circuit 74 and the circuits 89 and 60, leading respectively from the deceleration detector and the acceleration detector. The mobile contacts 122 and 123 of said potentiometers are carried by levers 124 and 125 respectively, on whose extremities there are placed rollers 126 and 127, which cooperate with different points of the circular cam 128 driven by the wheel or through an independent movement. The roller 126 cooperates with a part 129 being at a maximum distance in relation to the center 130 of the cam, while the roller 127 cooperates with the part 131 being at a minimum distance and vice versa, as shown schematically in said figure. It is thus possible to obtain a form of the commutation signal which can be adapted with great precision to the optimum operation of the system.

Figure 8:
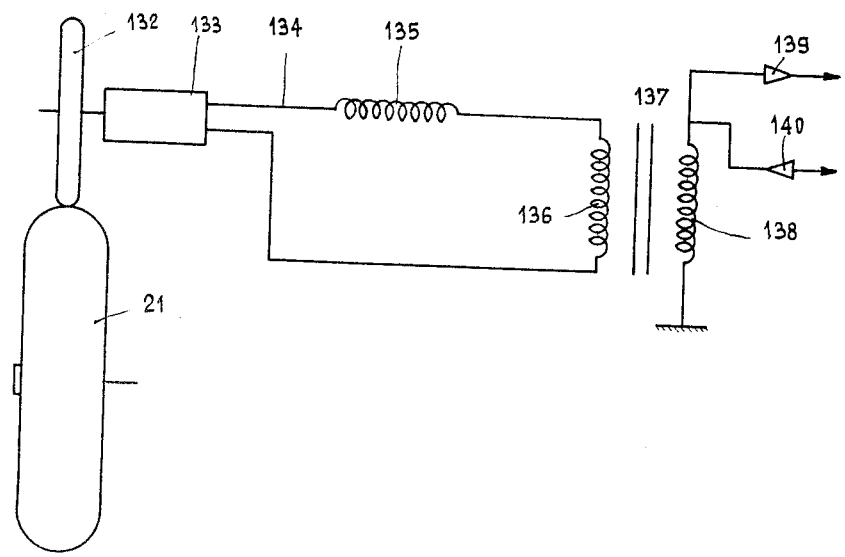
FIG. 8 is a schematic view of still another embodiment.

The invention covers also different embodiments in which the pick-up devices or detectors of the acceleration or the deceleration are of different types than those described above. Reference is made in that respect to FIG. 8 which concerns a modified embodiment. In this modification the wheel 21 drives by the intermediary of a roller 132 a tachymetric dynamo 133, which feeds a circuit 134 comprising a filter or an induction coil 135 and the primary winding 136 of a transformer 137. The variations of voltage in the secondary winding are characteristic of the accelerations and decelerations of the wheel 21. Two diode valves 139 and 140 at the output of said transformer furnish the signals of acceleration and the signals of deceleration into the corresponding registering devices, or devices having a time constant.

In this case, an amplifier is disposed immediately after the commutator or the switching device, said amplifier permitting to furnish a sufficiently important current to the electro hydraulic servo-distributor so as to make operation possible.

Figure 9:
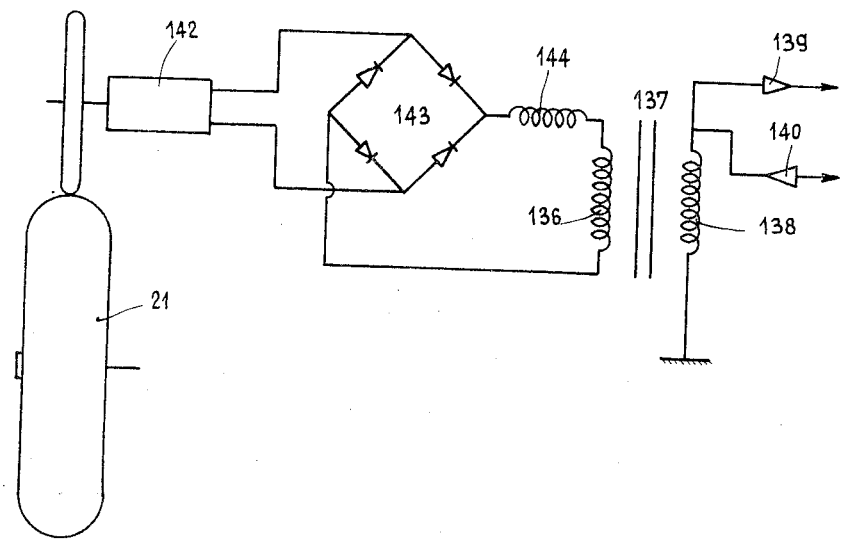
FIG. 9 is a schematic view of yet another embodiment.

Reference is now made to FIG. 9 which concerns another embodiment. In this modification the wheel 21 drives an alternator 142, which supplies an alternating voltage proportional to the speed of the wheel. This voltage is rectified by means of a bridge type rectifier 143, and the rectified voltage feeds a filter 144 and is fed into the primary winding 136 of transformer 137 similar to the one of the preceding embodiment, at the output of which there are installed the diodes 139 and 140 in order to furnish the signals of acceleration and deceleration, respectively.

While I have herein shown and described my invention in what I have conceived to be the most practical and preferred embodiment, it is recognised that departures may be made therefrom within the scope of my invention, which is not to be limited to the details disclosed herein, but is to be accorded the full scope of the claims so as to embrace any and all equivalent devices.

Having described my invention herein, what I claim as new and desire to secure by Letters Patent is:

1. In an electro hydraulic braking installation of a wheeled vehicle having a servo-distributor provided with a coil winding: means for bringing into an electrical relation said coil winding during successive time periods with a first source of current and with a second source of current, the first source providing a current intensity proportional to the angular acceleration attained by the wheel during the time period immediately preceding the time period of electrical relationship with the coil winding and the second source providing a current intensity proportional to the angular deceleration attained by the wheel during the time period preceding that of electrical relationship with the coil winding.

2. In an electro-hydraulic braking installation of a wheeled vehicle having a servo-distributor with a coil winding: means for connecting said coil winding periodically to an electric condenser and means for connecting electrically said condenser to a source having an electric potential of a value depending on the angular acceleration of a wheel, when said condenser is not connected to said coil winding.

3. In an electro-hydraulic braking installation of a wheeled vehicle having a servo-distributor with a coil winding: means for connecting periodically said winding electrically with, successively, a first electric condenser and a second electric condenser, means for charging one of said condenser during the time period when it is not in electrical relation with said coil winding by means of a source of electric voltage whose value depends on the angular deceleration of a wheel, and means for charging the other condenser, during the other periods, by means of a source of electric voltage whose value depends on the angular acceleration of said wheel.

4. An electro-hydraulic braking installation of a wheeled vehicle comprising a hydraulic brake for a wheel, a hydraulic circuit for the application of the braking fluid to said brake, a fluid distributor comprising a control coil winding for the regulation of the pressure of the braking fluid in said circuit, a first angular acceleration detector of the potentiometer type driven by means of said wheel, a first electric circuit comprising a condenser chargeable by means of said detector, a second angular deceleration detector of the potentiometer type driven by means of said wheel, a second electric circuit comprising a condenser chargeable by means of said second detector, means for periodically connecting electrically the coil winding with one or the other condenser, and means for regulating the current in the coil winding and originating from one or the other condenser independently of said angular acceleration or of said angular deceleration.

5. An installation according to claim 4 wherein the regulated electric current has a value varying as a function of the vertical displacement of the wheel.

6. An installation according to claim 4, wherein the detectors are inertia type detectors.

7. In an electro-hydraulic braking installation of a wheeled vehicle having a servo-distributor with a coil winding: a first electric source connected to said coil winding having a voltage which is a function of the angular acceleration attained by a wheel of the vehicle, a second electric source connected to said coil winding having a voltage which is a function of the angular deceleration attained by said wheel, circuits for applying the voltage of the electric sources to the coil winding comprising potentiometer resistances variable periodically as a function of the angular position of said wheel, one of these resistances having its maximum value when the other resistance has its minimum value, and vice versa.

8. In a hydraulic braking installation of a wheeled vehicle, a brake control sensitive to the intensity of an electric current: means for putting the electric control member of the installation periodically in electrical relation with a first source of electric voltage and with a second source of electric voltage, means for charging the one or the other of said sources during the time period when it is not connected to said member to an electric voltage depending on the value of the angular acceleration of the wheel for one source and on the value of the angular deceleration of said wheel for the other source.

9. An installation according to claim 8, wherein the charging means comprise a tachymetric dynamo driven by means of said wheel, transformer means whose primary side is fed from said dynamo, two electrical unidirectional circuits fed from the secondary side of said transformer, and having opposed direction for the flow of the current and connected to one or to the other of said sources, respectively.

10. An installation according to claim 8, wherein the electric charging means comprise an alternator driven by means of said wheel, rectifying means fed by said alternator, a transformer whose primary side is connected onto the circuit of the rectified current and two electrical circuits permitting only unidirectional flow of the current, the direction of flow of the one being opposed to the direction of flow of the other, connected onto the secondary side of the transformer and connected to the first and second said sources, respectively.

11. In a hydraulic braking installation of a wheeled vehicle wherein the pressure of the braking fluid is proportional to an electric current flowing in a control circuit: first means of electric current supply, second means of electric supply, commutation means interposed between said first supply means and said second supply means, on the one hand, and said control circuit, on the other hand, for bringing the latter alternately into electrical relation with said first supply means and with said second supply means, said one supply means having a voltage magnitude proportional to the angular acceleration of a wheel during the immediately preceding phase when the control circuit is in electrical relation with the other supply means.

12. In a hydraulic braking installation with an electric control, wherein the pressure of the braking fluid is proportional to the density of electric current flowing in a control circuit: a first electric supply circuit for said control circuit, a second electric supply circuit for said control circuit, means to bring said control circuit alternately and periodically in relation with said first supply circuit and said second supply circuit, said first supply circuit comprising an electric condenser, means including potentiometric resistance for charging said condenser proportionately to the positive angular acceleration of a wheel, said second supply means comprising a second condenser and second means including potentiometric resistance for charging said second condenser proportionately to the angular deceleration of said wheel, and means for applying to said control circuit an electric voltage of a magnitude dependent upon the position of an actuating member.

References Cited by the Examiner
UNITED STATES PATENTS

| | | | |
|---|---|---|---|
| 2,249,868 | 7/1941 | Sorensen | 303—21 |
| 2,906,376 | 9/1959 | Zeigler | 188—85 |
| 3,017,145 | 1/1962 | Yarber | 244—111 |

EUGENE G. BOTZ, *Primary Examiner.*